US012576742B2

(12) United States Patent     (10) Patent No.:   US 12,576,742 B2

Forsman-Kendall et al.     (45) Date of Patent:    Mar. 17, 2026

(54) MOBILE BATTERY STATION FOR ASSISTING TRANSFER OF POWER FROM AN ELECTRIC VEHICLE TO A HOME OR OTHER DEVICES

(71) Applicant: GM GLOBAL TECHNOLOGY OPERATIONS LLC, Detroit, MI (US)

(72) Inventors: Ian Forsman-Kendall, Farmers Branch, TX (US); Bridget A. Beaton, Novi, MI (US); Colton David Kettelhut, Circle Pines, MN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 653 days.

(21) Appl. No.: 18/077,712

(22) Filed: Dec. 8, 2022

(65) Prior Publication Data

US 2024/0190280 A1     Jun. 13, 2024

(51) Int. Cl.

| | |
|---|---|
| *B60L 53/62* | (2019.01) |
| *B60L 55/00* | (2019.01) |
| *H02J 3/32* | (2006.01) |
| *H02J 7/00* | (2006.01) |
| *H02J 7/34* | (2006.01) |
| *H02M 5/45* | (2006.01) |

(52) U.S. Cl.
CPC .............. *B60L 53/62* (2019.02); *B60L 55/00* (2019.02); *H02J 3/322* (2020.01); *H02J*

*7/0063* (2013.01); *H02J 7/342* (2020.01); *H02M 5/4505* (2013.01); *B60L 2210/30* (2013.01)

(58) Field of Classification Search
CPC ....................................................... B60L 53/62
USPC ........................................................ 320/109
See application file for complete search history.

(56) References Cited

U.S. PATENT DOCUMENTS

| | | | | |
|---|---|---|---|---|
| 2009/0063680 A1* | 3/2009 | Bridges | ................... | B60L 53/20 |
| | | | | 709/224 |
| 2012/0091953 A1* | 4/2012 | Paryani | ................... | B60L 53/63 |
| | | | | 320/109 |
| 2013/0020993 A1* | 1/2013 | Taddeo | ................... | B60L 53/65 |
| | | | | 320/109 |
| 2018/0069406 A1* | 3/2018 | Solomon | ................. | G06F 21/31 |

\* cited by examiner

*Primary Examiner* — Yalkew Fantu

(57) ABSTRACT

A vehicle charging system includes a charging station comprising a controller configured to selectively supply power from a vehicle to a home. The controller enables charging in response to a predetermined minimum voltage and a predetermined minimum current on an electric vehicle supply equipment (EVSE) side of the charging station. A mobile battery station is configured to supply power from a plurality of batteries to the EVSE side of the charging station at a first voltage greater than or equal to the predetermined minimum voltage and a first current greater than the predetermined minimum current.

18 Claims, 12 Drawing Sheets

MOBILE BATTERY STATION FOR ASSISTING TRANSFER OF POWER FROM AN ELECTRIC VEHICLE TO A HOME OR OTHER DEVICES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to mobile battery stations, and more particularly to mobile battery stations for assisting transfer of power from an electric vehicle to a home or other devices.

Electric vehicles (EVs) such as pure electric vehicles and/or plug-in hybrid electric vehicles include a battery system including one or more battery packs and/or modules each including a plurality of battery cells. During charging, the EVs are connected by a charging station to a home inverter/rectifier/hub receiving power from a utility. When utility power is lost, it may be difficult to deliver power to the home from the vehicle due to operating requirements of the charging station.

SUMMARY

A vehicle charging system includes a charging station comprising a controller configured to selectively supply power from a vehicle to a home. The controller enables charging in response to a predetermined minimum voltage and a predetermined minimum current on an electric vehicle supply equipment (EVSE) side of the charging station. A mobile battery station is configured to supply power from a plurality of batteries to the EVSE side of the charging station at a first voltage greater than or equal to the predetermined minimum voltage and a first current greater than the predetermined minimum current.

In other features, the mobile battery station comprises a user interface configured to select one of a plurality of operating modes. A DC-DC converter/charger is configured to supply power from the plurality of batteries to a home inverter/rectifier/hub connected to the EVSE side of the charging station and to receive power from the home inverter/rectifier/hub to charge the plurality of batteries.

In other features, the plurality of batteries includes an internal battery pack including first ones of the plurality of batteries. The plurality of batteries comprise P external batteries connected to the mobile battery station, where P is an integer greater than zero. The mobile battery station comprises P ports, wherein at least one of the P ports includes a first connection format, and an adapter configured to adapt a second connection format of at least one of the P external batteries to the first connection format of the at least one of the P ports. The P external batteries comprise batteries configured to power at least one of power tools and equipment.

In other features, the mobile battery station comprises a rectifier. Based on the selected one of the plurality of operating modes of the mobile battery station, the mobile battery station is configured to rectify at least one 120V AC and 240V AC to a DC voltage.

In other features, the mobile battery station comprises an inverter. Based on the selected one of the plurality of operating modes of the mobile battery station, the mobile battery station is configured to invert a DC voltage from the DC-DC converter/charger to supply at least one 120V AC and 240V AC.

Based on the selected one of the plurality of operating modes of the mobile battery station, the DC-DC converter/charger is configured to output power from the plurality of batteries to the vehicle. Based on the selected one of the plurality of operating modes of the mobile battery station, the DC-DC converter/charger is selectively configured to at least one of output power from the plurality of batteries to the vehicle; and receive power from the vehicle and charge the plurality of batteries.

A method for operating a vehicle charging system includes providing a charging station comprising a controller configured to selectively supply power from a vehicle to a home. The controller enables charging in response to a predetermined minimum voltage and a predetermined minimum current on an electric vehicle supply equipment (EVSE) side of the charging station. The method includes configuring a mobile battery station to supply power from a plurality of batteries to the EVSE side of the charging station at a first voltage greater than or equal to the predetermined minimum voltage and a first current greater than the predetermined minimum current.

In other features, the method includes selecting one of a plurality of operating modes of the mobile battery station; supplying power from the plurality of batteries to a home inverter/rectifier/hub connected to the EVSE side of the charging station; and receiving power from the home inverter/rectifier/hub to charge the plurality of batteries. The plurality of batteries includes an internal battery pack including first ones of the plurality of batteries. The plurality of batteries comprise P external batteries connected to the mobile battery station, where P is an integer greater than zero.

In other features, the mobile battery station comprises P ports, wherein at least one of the P ports includes a first connection format. The method includes using an adapter configured to adapt a second connection format of at least one of the P external batteries to the first connection format of the at least one of the P ports. The P external batteries comprise batteries configured to power at least one of power tools and equipment. The mobile battery station comprises a rectifier, and further comprising configuring the mobile battery station to rectify at least one 120V AC and 240V AC to a DC voltage based on the selected one of the plurality of operating modes of the mobile battery station. The mobile battery station comprises an inverter, and further comprising configuring the mobile battery station to invert a DC voltage to supply at least one 120V AC and 240V AC based on the selected one of the plurality of operating modes of the mobile battery station. The method includes outputting power from the plurality of batteries to the vehicle based on the selected one of the plurality of operating modes of the mobile battery station.

In other features, based on the selected one of the plurality of operating modes of the mobile battery station, the method includes outputting power from the plurality of batteries to the vehicle and receiving power from the vehicle and charge the plurality of batteries.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An electric vehicle (EV) stores a significant amount of power in the battery system. During a power outage, it would be convenient to allow the EV to supply power to the home. However, before doing so, some charging stations may require a predetermined minimum voltage and current to be present on an electric vehicle supply equipment (EVSE) side of the charging station.

Since the home is not powered, it is unable to supply the predetermined minimum voltage and current to the EVSE side of the charging station. Power needs to be supplied by another power source on the EVSE side to allow the vehicle to supply power through the charging station to the home.

A mobile battery station (MBS) according to the present disclosure supplies power to the EVSE side of the charging station during a power outage to enable the vehicle to supply power through the charging system to the home. The MBS according to the present disclosure can also support other functions such as charging an internal battery pack and/or external batteries from a home inverter/rectifier/hub, supplying 120V or 240V power from the internal battery pack and/or the external batteries when the MBS is disconnected from the power, charging the internal battery pack and/or the external batteries from a 120V or 240V source when utility power is available, powering the vehicle for shorter distances when the vehicle and the MBS are not near another power source, and/or other operating modes described further below.

The mobile battery station according to the present disclosure functions in multiple uses for vehicle to anything (V2X), anything to vehicle (X2V), and consumer battery charger by integrating existing consumer products from other industries. This will provide the ability for consumers to charge various lithium-ion battery products from different manufacturers and provide a power source for mobile jump charge and dark start operation for customer vehicle to home (V2H) charging station.

Consumers typically own a variety of lithium-ion battery products from various manufacturers. The mobile battery station is configured to charging these different products. The mobile battery station is configured to supply voltage on the EVSE side during a power outage to establish an electrical connection between the vehicle and the charging station.

Figure 1:
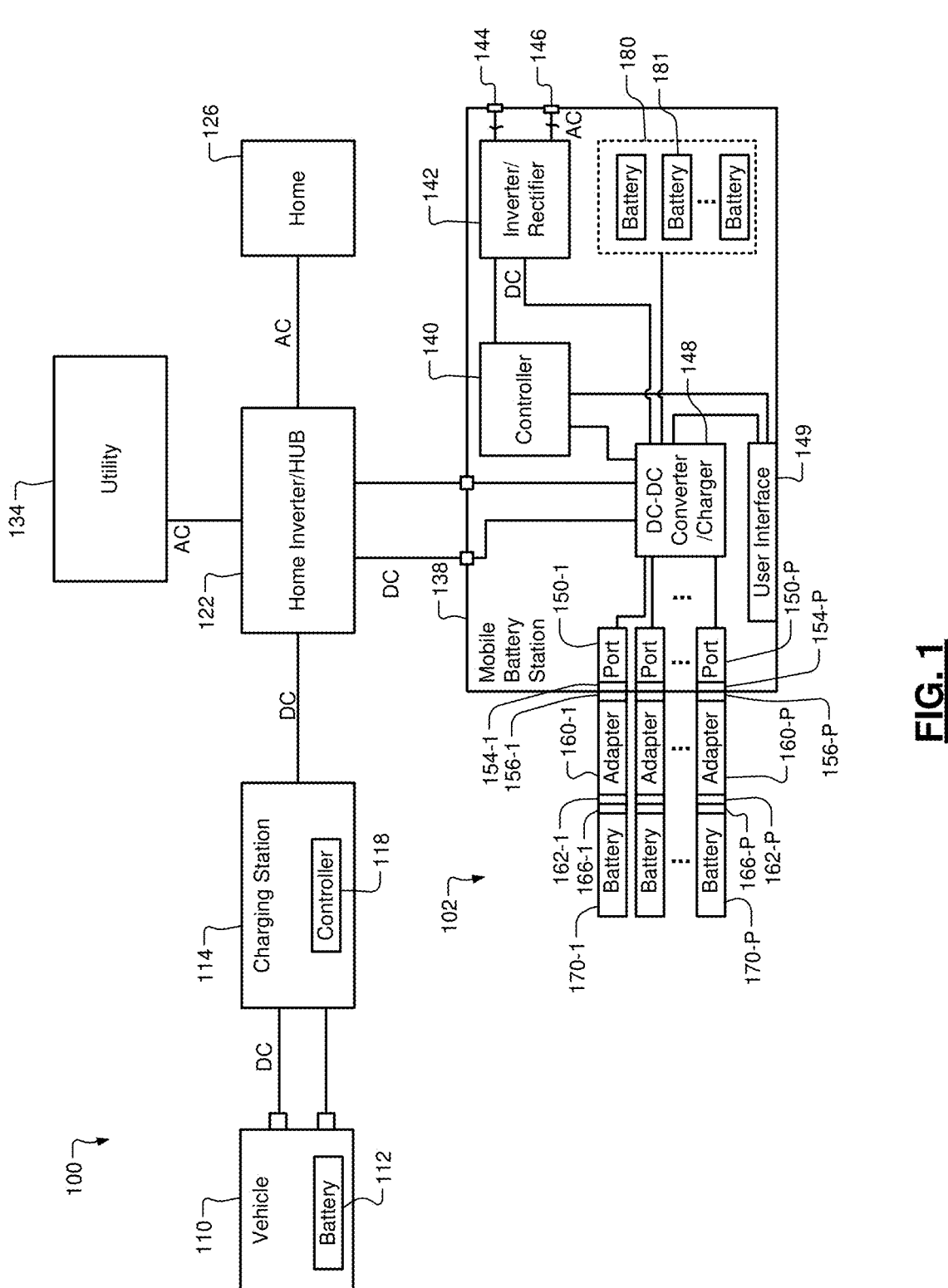
FIG. 1 is a functional block diagram of a vehicle charging system and a mobile battery station according to the present disclosure.

Referring now to FIG. 1, a vehicle charging system 100 and a mobile battery station (MBS) 102 are shown. A vehicle 110 including a battery system 112 is selectively connected to a charging station 114 and directly or indirectly to the MBS 102 depending upon a selected mode of operation.

The charging station 114 includes a controller 118 configured to control flow of power to and from the vehicle 110 during charging or supplying power to a home as will be described further below. The charging station 114 is connected to a home inverter/rectifier/hub 122. The home inverter/rectifier/hub 122 converts AC power from a utility 134 to DC power for charging and DC power from the vehicle 110 to AC power. The utility 134 supplies AC power to a home 126 or the home inverter/rectifier/hub 122.

The MBS 102 includes an enclosure 138, a controller 140, an inverter/rectifier 142, a 120V plug connector 144, a 240V plug connector 146, a DC-DC converter/charger 148, and/or a user interface 149. The user interface 149 allows a user to select and/or change an operating mode of the MBS 102 as will be described further below. The user interface 149 may include a manual switch, a touchpad, a keypad, and/or a display device.

The inverter/rectifier 142 acts as a rectifier to convert AC power (e.g., 120V or 240V) to DC and/or as an inverter to convert DC power to AC power (e.g., at 120V or 240V) depending upon a selected mode of the MBS 102. The DC-DC converter/charger 148 acts as a bidirectional DC-DC converter that converts one or more DC voltages at one input/output node to one or more other DC voltages at another input/output node. The DC-DC converter/charger 148 also acts as a charger to supply charging current to an internal battery pack and/or external batteries such as commercial power tool, e-bike, lawn equipment batteries, etc., as described below. The controller 140 controls the DC-DC converter/charger 148 and the inverter/rectifier 142 based on the operating mode selected via the user interface 149.

The MBS 102 further includes ports 150-1, 150-2, . . . , and 150-P. The ports 150-1, 150-2, . . . , and 150-P include first connectors 154-1, 154-2, . . . , and 154-P having a first connection format or a set of two or more connection formats. Adapters 160-1, 160-2, . . . , and 160-P include second connectors 156-1, 156-2, . . . , and 156-P having the first connection format (or first set of connection formats) and third connectors 162-1, 162-2, . . . , and 162-P having one or more other types of connection formats. The adapters 160-1, 160-2, . . . , and 160-P are connected by the second connectors 156-1, 156-2, . . . , and 156-P to the first connectors 154-1, 154-2, . . . , and 154-P of the ports 150-1, 150-2, . . . , and 150-P.

External batteries 170-1, 170-2, . . . , and 170-P include fourth connectors 166-1, 166-2, . . . , and 166-P having the one or more other types of connection formats. The external batteries 170-1, 170-2, . . . , and 170-P can include commercially available battery packs for power tools, electric bikes, electric equipment such as mowing equipment, etc. that have one or more different power levels (Ah), voltage levels and/or connection formats. The external batteries 170-1, 170-2, . . . , and 170-P are connected by the fourth connectors 166-1, 166-2, . . . , and 166-P to the third connectors 162-1, 162-2, . . . , and 162-P.

The adapters 160-1, 160-2, . . . , and 160-P adapt the connection formats of the one or more other types of connectors of the external batteries 170-1, 170-2, . . . , and 170-P to the first connector format (or first set of connector formats) of the ports 150-1, 150-2, . . . , and 150-P. However, one or more of the adapters 160-1, 160-2, . . . , and 160-P may be omitted if corresponding ones of the external batteries 170-1, 170-2, . . . , and 170-P already have the first connection format or one of the first set of connector formats.

In some examples, the MBS 102 includes an internal battery pack 180 including one or more batteries 181. In other examples, the MBS 102 does not include the internal battery pack 180 and the MBS 102 relies upon the external batteries 170-1, 170-2, . . . , and 170-P only.

Figure 2A:
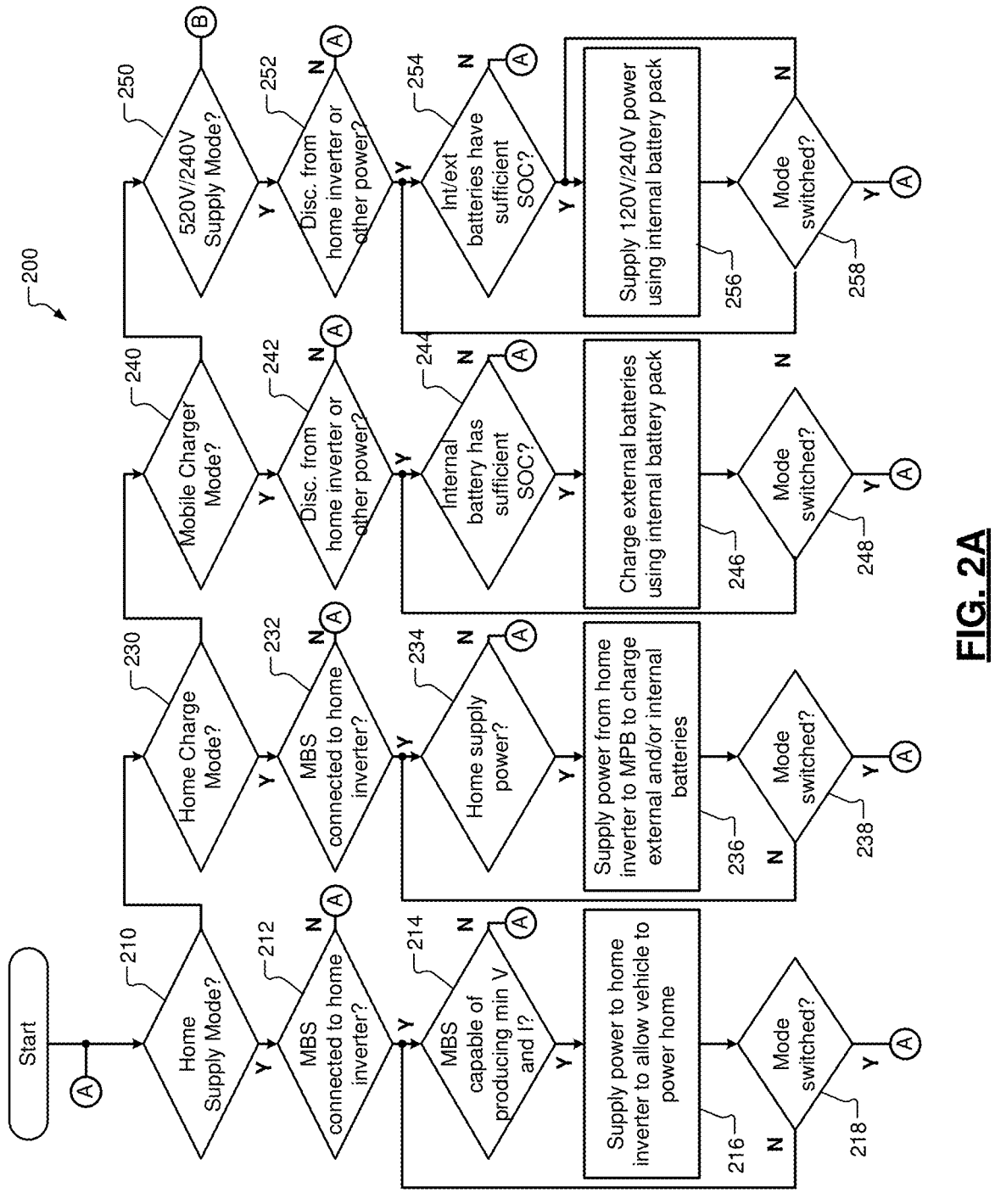
FIGS. 2A and 2B are flowcharts of a method for operating the mobile battery station in different modes according to the present disclosure.
Figure 2B:
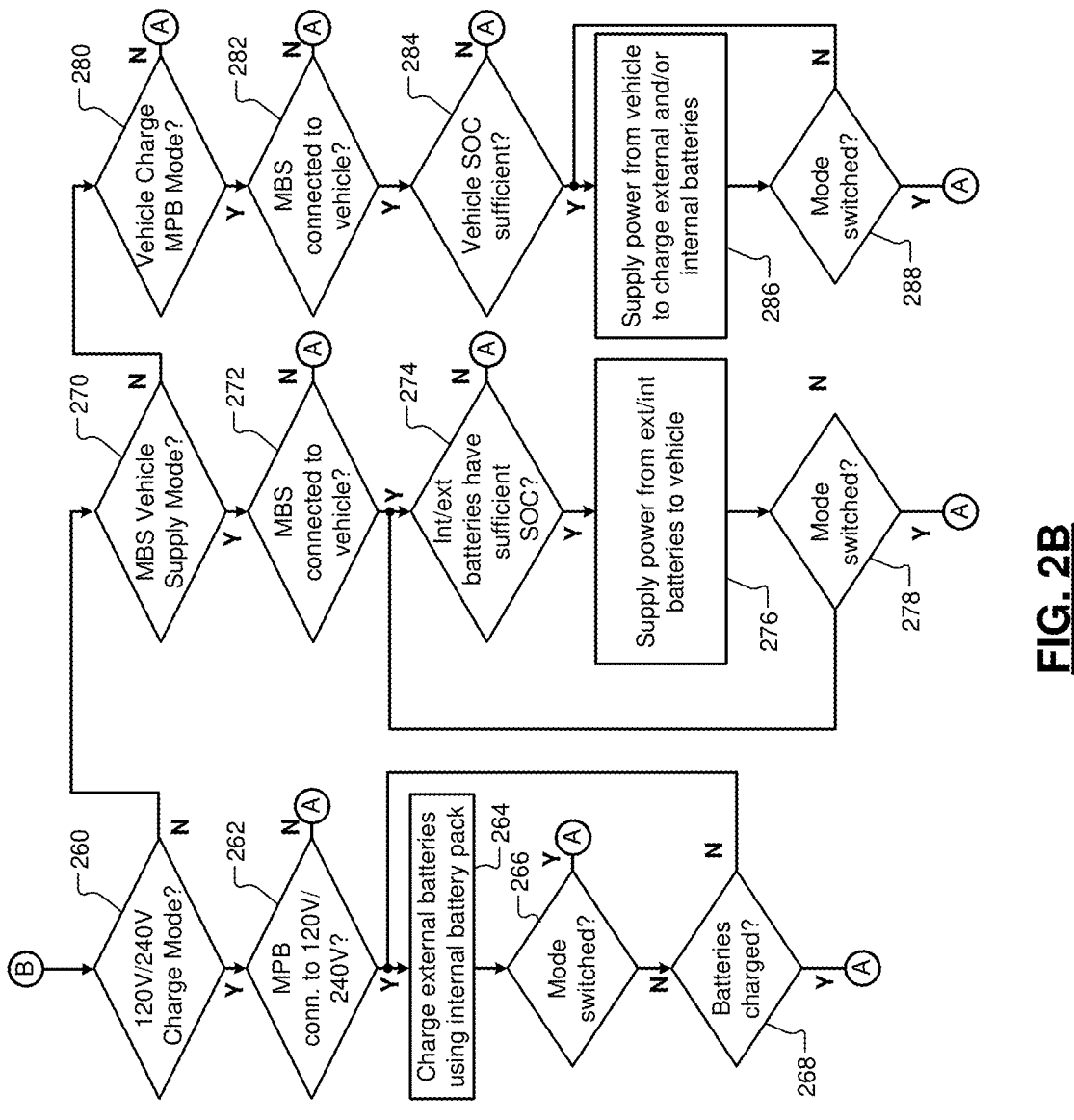

Referring now to FIGS. 2A and 2B, a method 200 for operating the MBS 102 in different modes is shown. At 210, the method 200 determines whether the home supply mode is selected. During this mode, the MBS 102 provides power to the charging station 114 so that the controller 118 allows power to be supplied by the vehicle 110 to the home 126.

At 212, the method 200 determines whether the MBS 102 is connected to the home inverter/rectifier/hub 122. If 212 is true, the method determines at 214 whether the battery is capable of producing the minimum voltage and current to allow the charging station 114 to accept power from the vehicle 110. In some examples, the controller 118 of the charging station 114 may require a minimum voltage (e.g., such as 300V) and a minimum current (e.g., such as 1 A, 0.25 A, etc.) to be supplied for a predetermined period before enabling flow of power from the vehicle 110 to the home 126.

If 214 is true, the MBS 102 supplies power from the internal battery pack 180 and/or the external batteries 170-1, 170-2, . . . , and 170-P to the home inverter/rectifier/hub 122 to enable the controller 118 and allow the vehicle 110 attached to the charging station 114 to supply power to the home 126. At 218, the method 200 determines whether the operating mode has been switched. If 218 is false, the method 200 returns to 214. If 210, 212, 214, or 218 are false, the method returns to 210.

If 210 is false, the method continues at 230. At 230, the method 200 determines whether the home charge mode is selected. During the home charge mode, the internal battery pack 180 and the external batteries 170-1, 170-2, . . . , and 170-P are charged by utility power from the home 126.

At 232, the method 200 determines whether the MBS 102 is connected to a home inverter/rectifier/hub 122. If 232 is true, the method determines whether the home 126 is capable of supplying power to the MBS 102 (e.g., the home 126 is connected to the utility and the utility is supplying power).

If 234 is true, the MBS 102 supplies power via the home inverter/rectifier/hub 122 to the internal battery pack 180 and/or external batteries 170-1, 170-2, . . . , and 170-P. At 238, the method 200 determines whether the operating mode has been switched or charging is complete. If 238 is false, the method 200 returns to 234. If 230, 232, 234, or 238 are false, the method returns to 210.

If 230 is false, the method continues at 240. At 240, the method 200 determines whether the mobile charger mode is selected. During the mobile charger mode, the internal battery pack 180 of the MBS 102 supplies power to charge the external batteries 170-1, 170-2, . . . , and 170-P.

At 242, the method 200 determines whether the MBS 102 is disconnected from the home inverter/rectifier/hub 122 or other power source. If 242 is true, the method determines whether the internal battery pack 180 of the MBS 102 has a sufficient state of charge to charge the external batteries 170-1, 170-2, . . . , and 170-P.

If 244 is true, the MBS 102 supplies power from the internal battery pack 180 to the external batteries 170-1, 170-2, . . . , and 170-P. At 248, the method 200 determines whether the operating mode has been switched or charging is complete. If 248 is false, the method 200 returns to 244. If 240, 242, 244, or 248 are false, the method returns to 210.

If 240 is false, the method continues at 250. At 250, the method 200 determines whether the 120V/240V supply mode is selected. During the 120V/240V supply mode, the internal battery pack 180 and/or the external batteries 170-1, 170-2, . . . , and 170-P supply 120V or 240V to the plug connectors 144 or 146.

At 252, the method 200 determines whether the MBS 102 is disconnected from the home inverter/rectifier/hub 122 or other power source. If 252 is true, the method determines whether the internal battery pack 180 and/or the external batteries 170-1, 170-2, . . . , and 170-P of the MBS 102 have a sufficient state of charge to charge to supply 120V/240V power.

If 254 is true, the MBS 102 supplies 120V/240V power from the internal battery pack 180 and/or the external batteries 170-1, 170-2, . . . , and 170-P. At 258, the method 200 determines whether the operating mode has been switched. If 258 is false, the method 200 returns to 254. If 250, 252, 254, or 258 are false, the method returns to 210.

If 250 is false, the method continues at 260. At 260, the method 200 determines whether the 120V/240V charge mode is selected. During the 120V/240V charge mode, the internal battery pack 180 and/or the external batteries 170-1, 170-2, . . . , and 170-P are charged by 120V or 240V power from the plug connectors 144 or 146.

At 262, the method 200 determines whether the MBS 102 is connected to a power source supply 120V/240V. If 262 is true, the MBS 102 charges the internal battery pack 180 and/or the external batteries 170-1, 170-2, . . . , and 170-P using the 120V/240V power source. At 268, the method 200 determines whether the operating mode has been switched or charging is complete. If 268 is false, the method 200 returns to 264. If 260, 262, 264, or 268 are false, the method returns to 210.

If 260 is false, the method continues at 270. At 270, the method 200 determines whether the MBS vehicle supply mode is selected. During the MBS vehicle supply mode, the internal battery pack 180 and/or the external batteries 170-1,

170-2, . . . , and 170-P supply power directly to the vehicle 110 to allow the vehicle 110 to be powered or driven for shorter distances.

At 272, the method 200 determines whether the MBS 102 is connected to a vehicle. If 272 is true, the method determines whether the internal battery pack 180 and/or the external batteries of the MBS 102 have a sufficient state of charge to charge to supply power to the vehicle 110.

If 274 is true, the MBS 102 supplies power from the internal battery pack and/or the external batteries 170-1, 170-2, . . . , and 170-P to the vehicle 110. At 278, the method 200 determines whether the operating mode has been switched (or the MBS 102 is disconnected). If 278 is false, the method 200 returns to 274. If 270, 272, 274, or 278 are false, the method returns to 210.

If 270 is false, the method continues at 280. At 280, the method 200 determines whether the vehicle charge MBS mode is selected. During the vehicle charge MBS mode, the vehicle 110 charges the internal battery pack 180 and/or the external batteries 170-1, 170-2, . . . , and 170-P.

At 282, the method 200 determines whether the MBS 102 is connected to a vehicle. If 282 is true, the method determines whether the vehicle 110 has a sufficient state of charge to supply power to the MBS 102.

If 284 is true, the vehicle 110 supplies power to the MBS 102 to charge the internal battery pack 180 and/or the external batteries 170-1, 170-2, . . . , and 170-P. At 288, the method 200 determines whether the operating mode has been switched or charging is complete. If 288 is false, the method 200 returns to 284. If 280, 282, 284, or 288 are false, the method returns to 210.

Figure 3A:
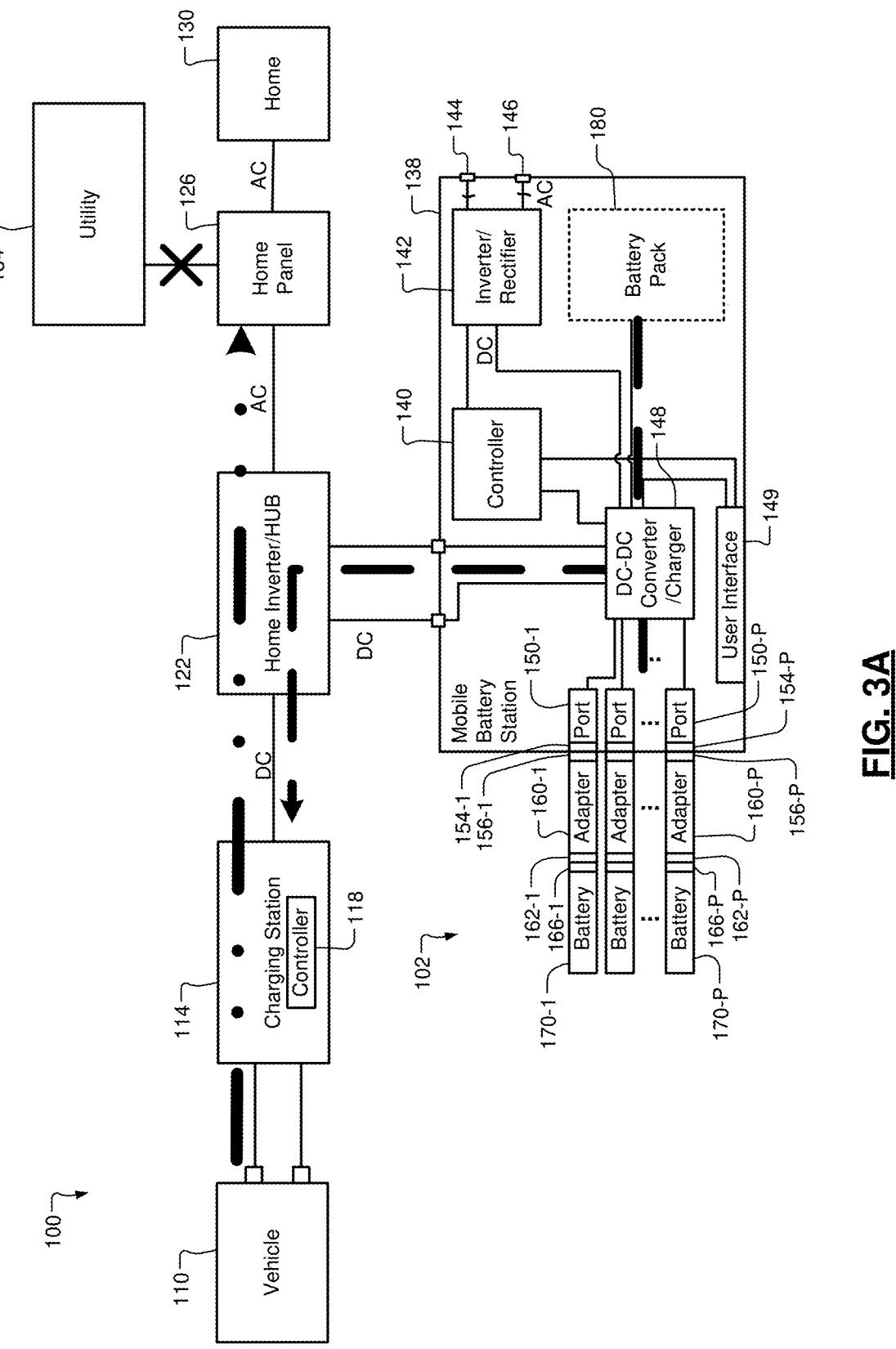
FIG. 3A is a functional block diagram of the vehicle charging system and a mobile battery station in a vehicle to home supply mode according to the present disclosure.

Referring now to FIG. 3A, the vehicle charging system 100 and the MBS 102 are shown in the vehicle to home supply mode. In this mode, the vehicle 110 supplies power to the home 126. However, before doing so, the controller 118 of the charging station 114 may not allow charging until a predetermined minimum voltage and current are present on the electric vehicle supply equipment side (EVSE).

Since the home 126 is without utility power in this case, power is supplied by the MBS 102 to the charging station 114. This allows the controller 118 to initiate supplying power from the vehicle 110 to the home 126. In some examples, the DC-DC converter/charger 148 converts and/or boosts the voltage of the internal battery pack 180 and/or external batteries 170-1, 170-2, . . . , and 170-P to the predetermined minimum voltage. In some examples, since the minimum current is fairly low, the voltage gain can be in a range from 1 to 12 times the voltage of the internal battery pack 180 and/or external batteries 170-1, 170-2, . . . , and 170-P.

Figure 3B:
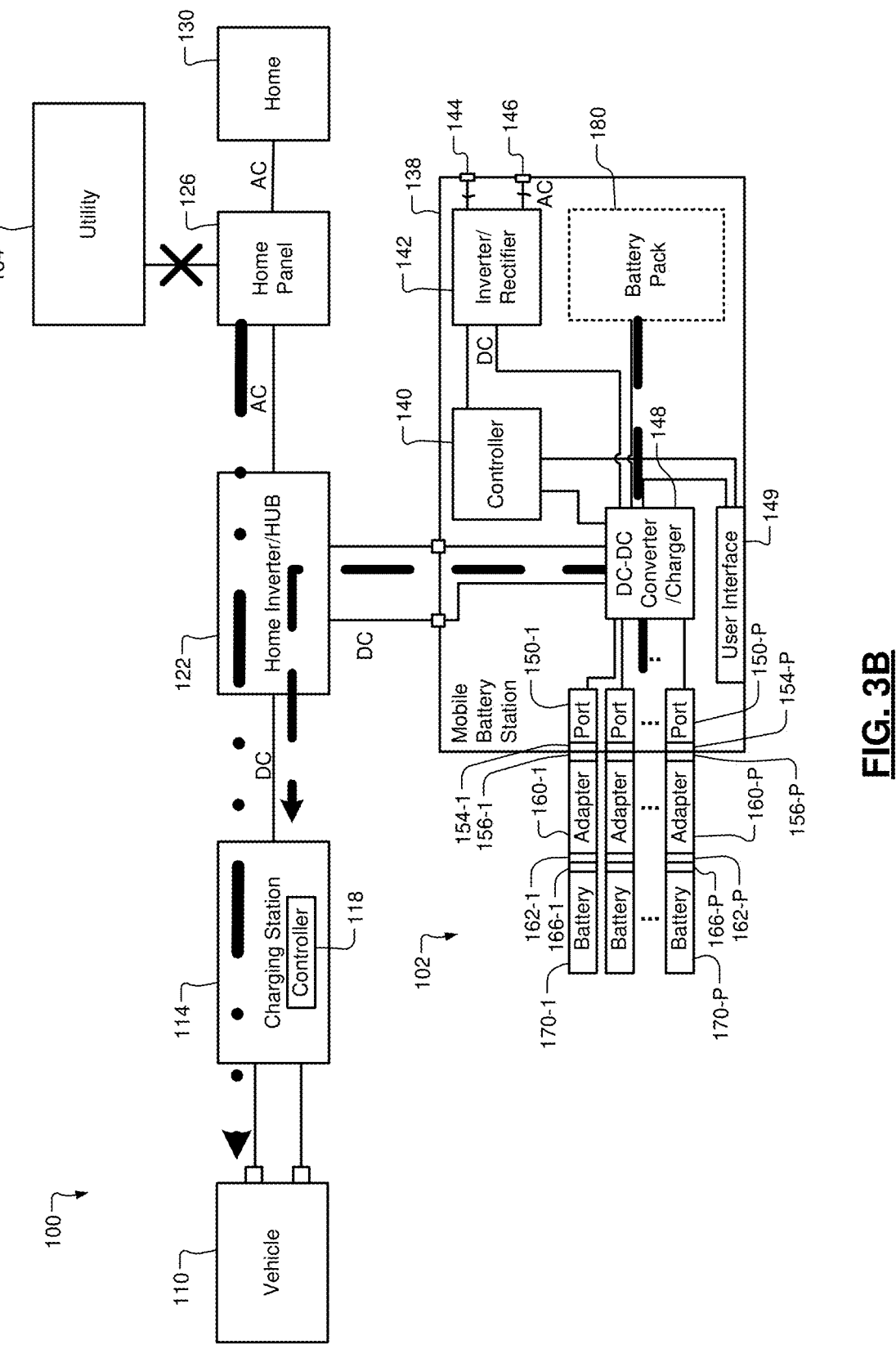
FIG. 3B is a functional block diagram of the vehicle charging system and a mobile battery station in a burst charge mode according to the present disclosure.

Referring now to FIG. 3B, the vehicle charging system 100 and the MBS 102 are shown in the burst supply mode. In this mode, the home 126 and the MBS 102 supply power to the vehicle 110 to fast charge the vehicle 110.

Figure 4:
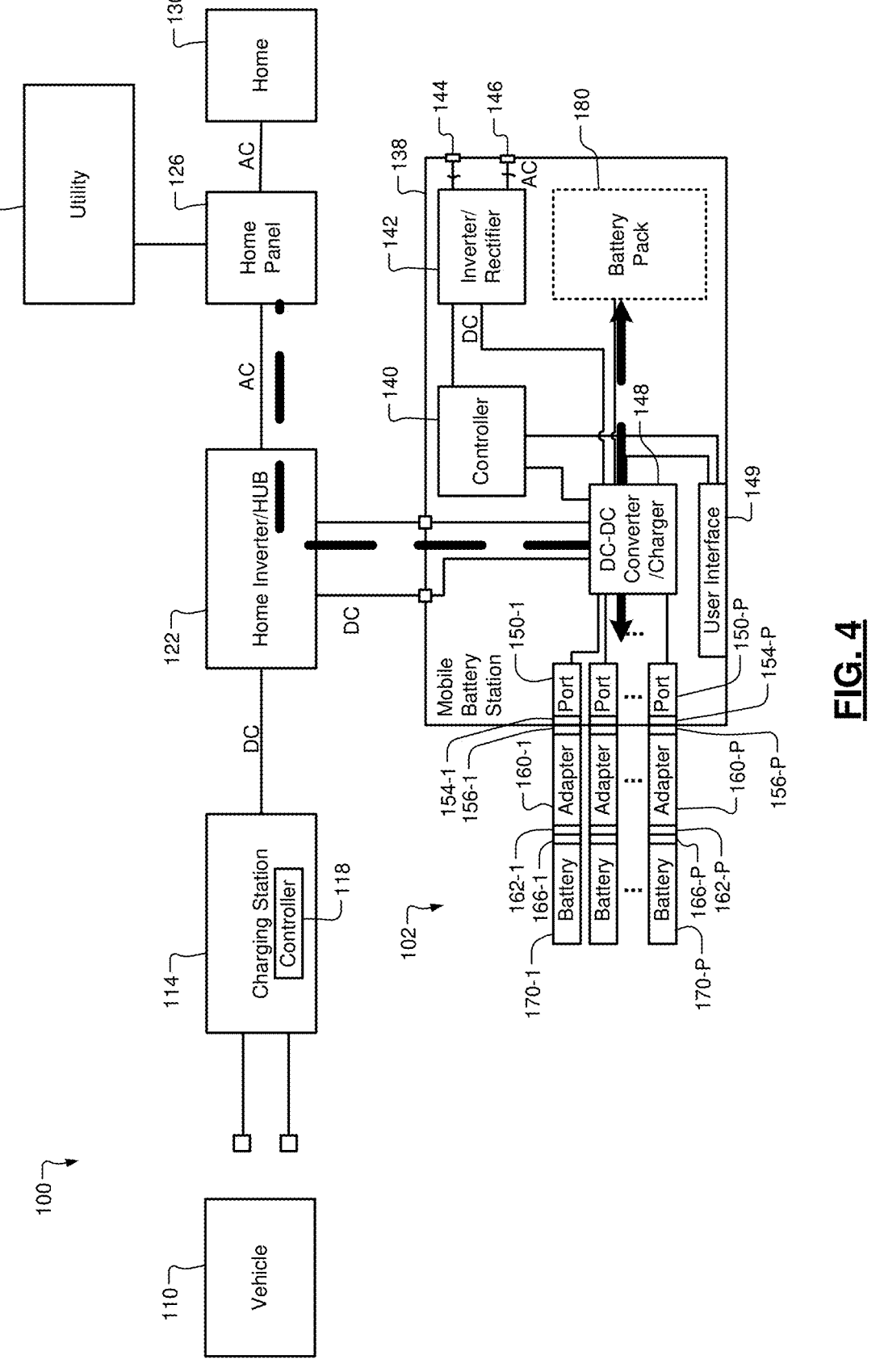
FIG. 4 is a functional block diagram of the vehicle charging system and a mobile battery station in a home charge mode according to the present disclosure.

Referring now to FIG. 4, the vehicle charging system 100 and the MBS 102 are shown in a home charge mode. In this mode, the home 126 has utility power and supplies power via the home inverter/rectifier/hub 122 to the MBS 102. The DC-DC converter/charger 148 converts the DC voltage to one or more DC voltage levels required by the internal battery pack 180 and/or external batteries 170-1, 170-2, . . . , and 170-P.

Figure 5:
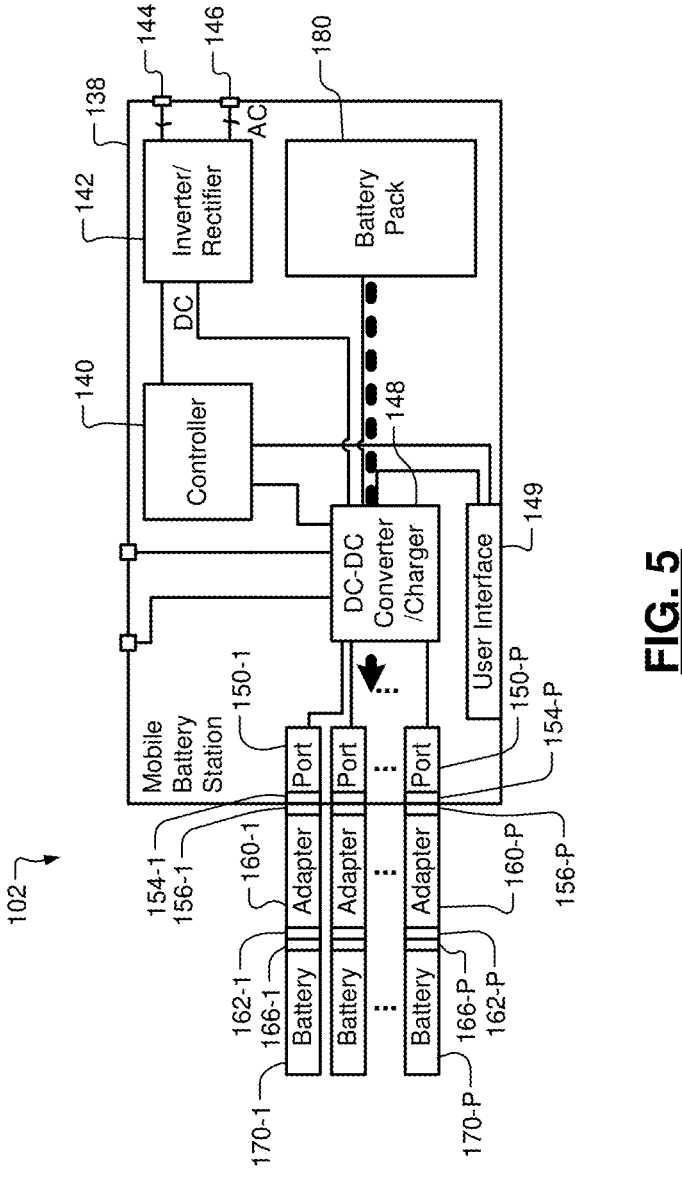
FIG. 5 is a functional block diagram of the vehicle charging system and a mobile battery station in a mobile charger mode according to the present disclosure.

Referring now to FIG. 5, the vehicle charging system 100 and the MBS 102 are shown in a mobile charger mode. In this mode, the MBS 102 is disconnected from the home inverter/rectifier/hub 122. The internal battery pack 180 supplies power to charge the external batteries 170-1, 170-2, . . . , and 170-P. The DC-DC converter/charger 148 converts the DC voltage to one or more DC voltage levels required by the external batteries 170-1, 170-2, . . . , and 170-P.

Figure 6:
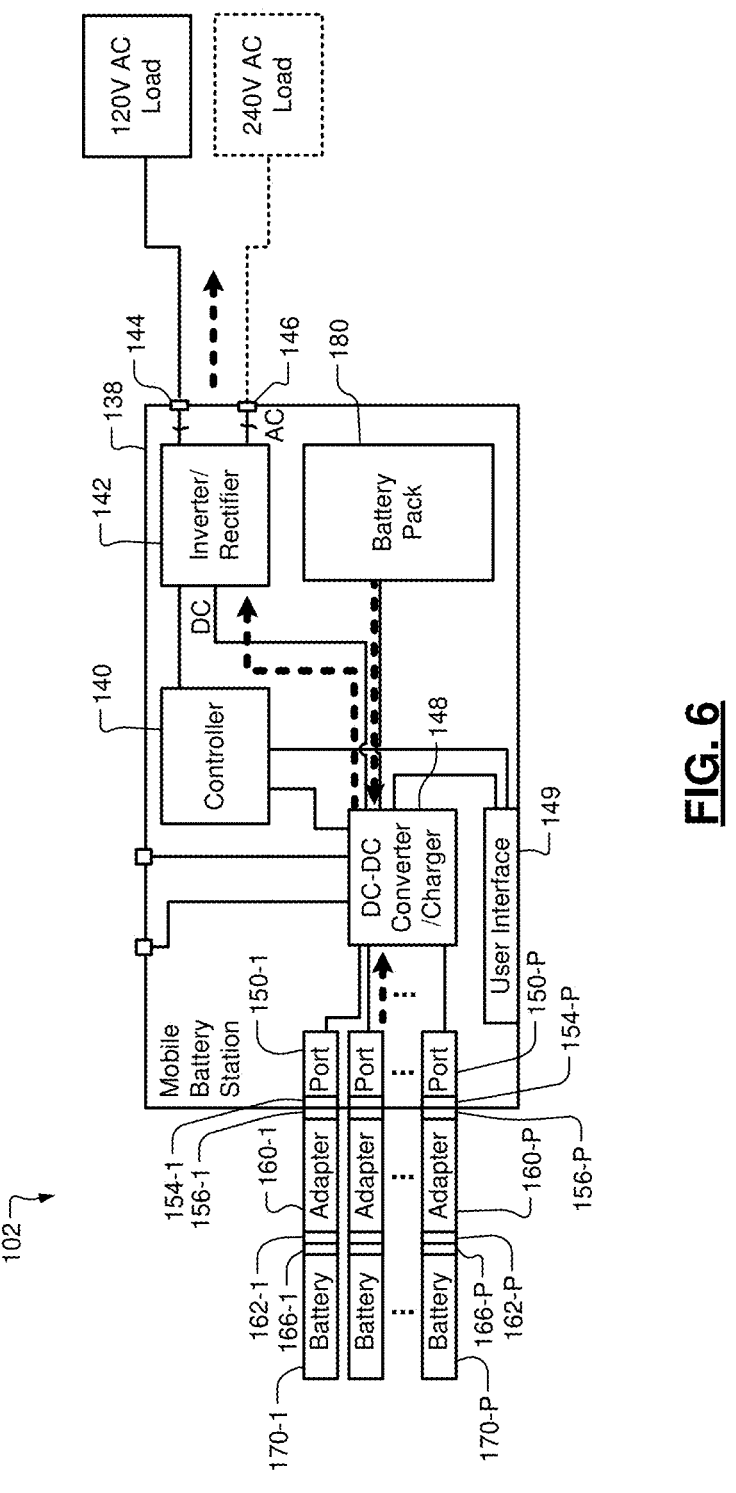
FIG. 6 is a functional block diagram of the vehicle charging system and a mobile battery station in a 120V/240V supply mode according to the present disclosure.

Referring now to FIG. 6, the vehicle charging system 100 and the MBS 102 are shown in a 120V/240V supply mode. In this mode, the internal battery pack 180 and/or external batteries 170-1, 170-2, . . . , and 170-P supply power to the inverter/rectifier 142 at 120V, 240V, or another voltage level. The DC-DC converter/charger 148 converts the DC voltage from the internal battery pack 180 and/or external batteries 170-1, 170-2, . . . , and 170-P to one or more DC voltage levels required by the inverter/rectifier 142.

Figure 7:
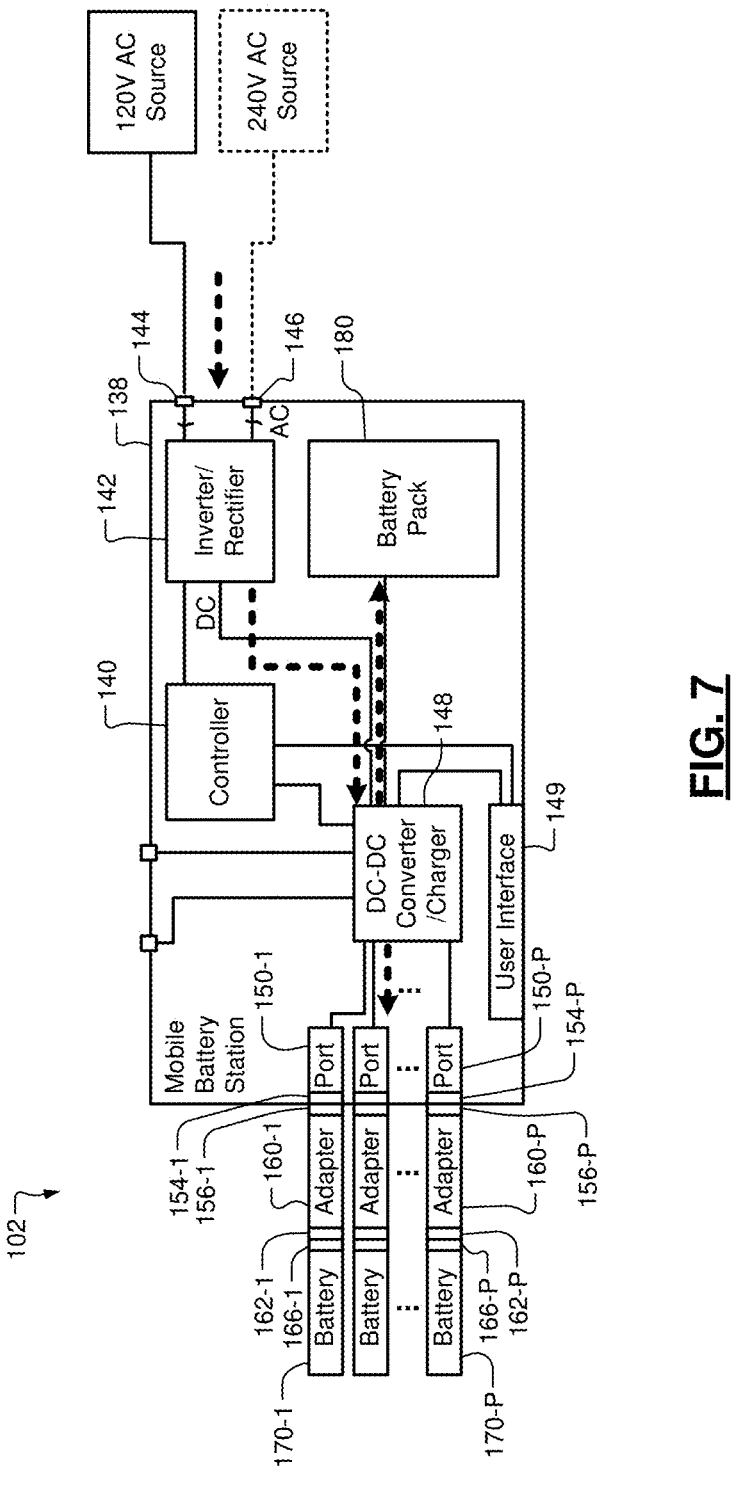
FIG. 7 is a functional block diagram of the vehicle charging system and a mobile battery station in a 120V/240V charge mode according to the present disclosure.

Referring now to FIG. 7, the vehicle charging system 100 and the MBS 102 are shown in a 120V/240V charge mode. In this mode, 120V/240V power is supplied to the inverter/rectifier 142 and/or the DC-DC converter/charger 148 and then to the internal battery pack 180 and/or external batteries 170-1, 170-2, . . . , and 170-P. The DC-DC converter/charger 148 converts the DC voltage from the inverter/rectifier 142 to the voltages of the internal battery pack 180 and/or external batteries 170-1, 170-2, . . . , and 170-P if needed.

Figure 8:
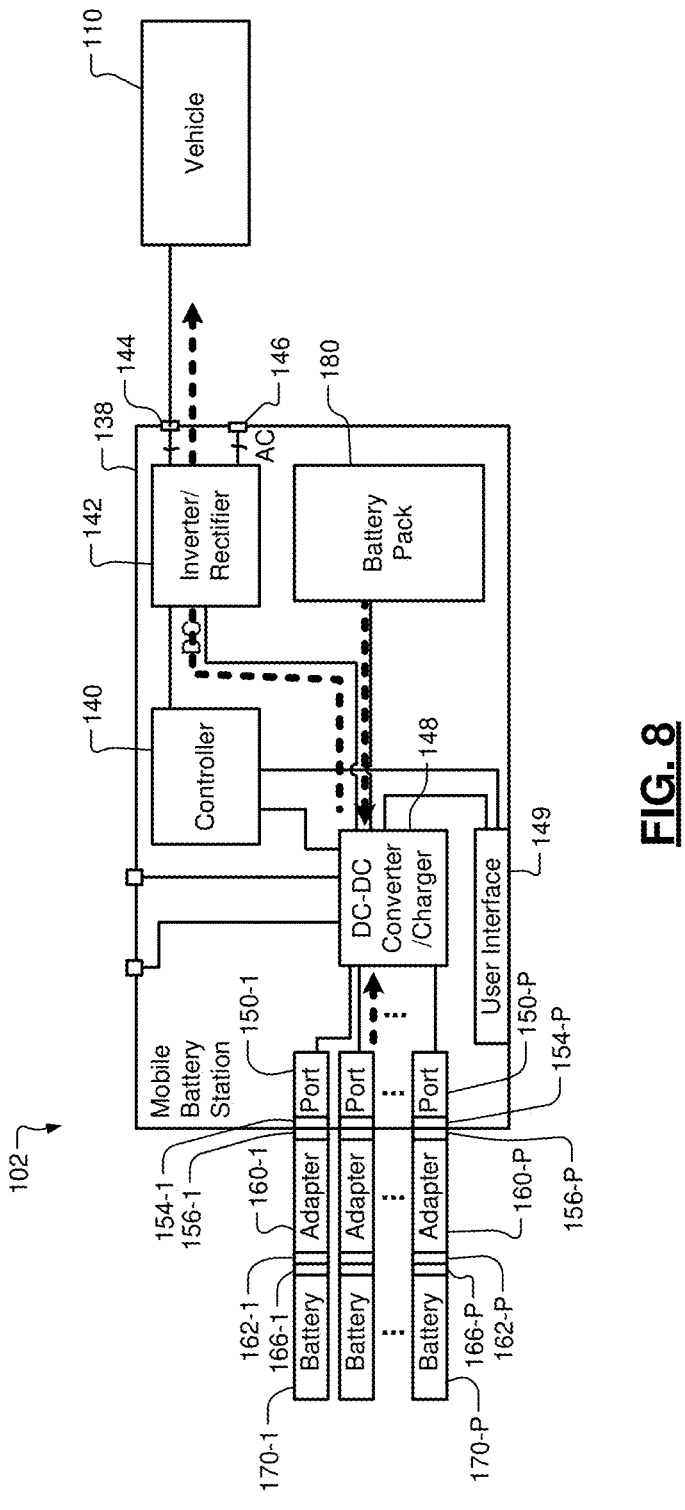
FIG. 8 is a functional block diagram of the vehicle charging system and a mobile battery station in an MPB vehicle supply mode according to the present disclosure.

Referring now to FIG. 8, the vehicle charging system 100 and the MBS 102 are shown in an MBS vehicle supply mode. In this mode, the vehicle 110 is not attached to the charging station 114 and the internal battery pack 180 and/or external batteries 170-1, 170-2, . . . , and 170-P of the MBS 102 supply power to the vehicle 110. The DC-DC converter/charger 148 converts the DC voltage from the internal battery pack 180 and/or external batteries 170-1, 170-2, . . . , and 170-P if needed. In some examples, the internal battery pack 180 and/or the external batteries 170-1, 170-2, . . . , and 170-P of the MBS 102 provide power to move the vehicle 110 a relatively short distance in a range from 0.1 miles to 20 miles, 0.1 miles to 10 miles, and/or 0.1 miles to 5 miles. In some examples, the vehicle 110 supplies power to the MBS 102 via the 120V line.

Figure 9:
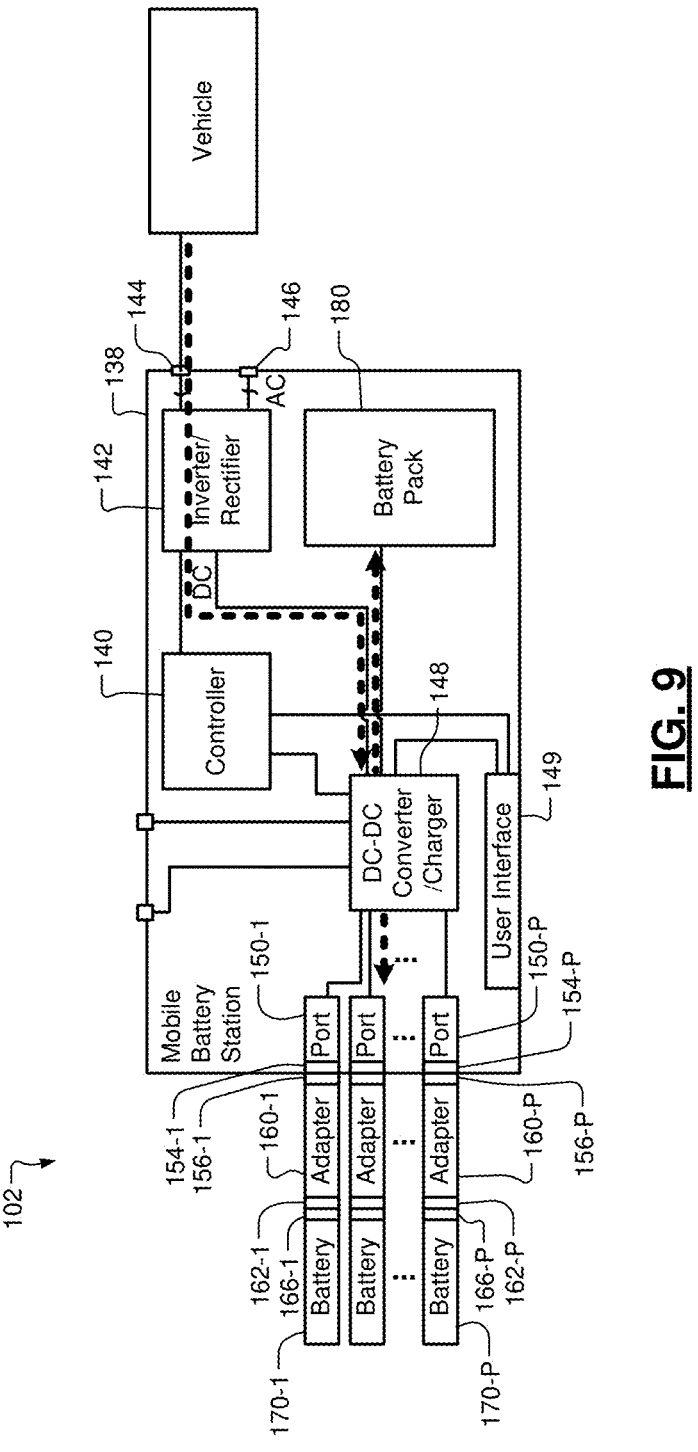
FIG. 9 is a functional block diagram of the vehicle charging system and a mobile battery station in a vehicle charge MPB mode according to the present disclosure.

Referring now to FIG. 9, the vehicle charging system 100 and the MBS 102 are shown in a vehicle charge MPB mode. In this mode, the vehicle 110 supplies power to charge the internal battery pack 180 and/or the external batteries 170-1, 170-2, . . . , and 170-P. The DC-DC converter/charger 148 converts the DC voltage from vehicle 110 to the voltages of the internal battery pack 180 and/or external batteries 170-1, 170-2, . . . , and 170-P if needed. In some examples, the vehicle 110 receives power from the MBS 102 via the 120V line.

Figure 10:
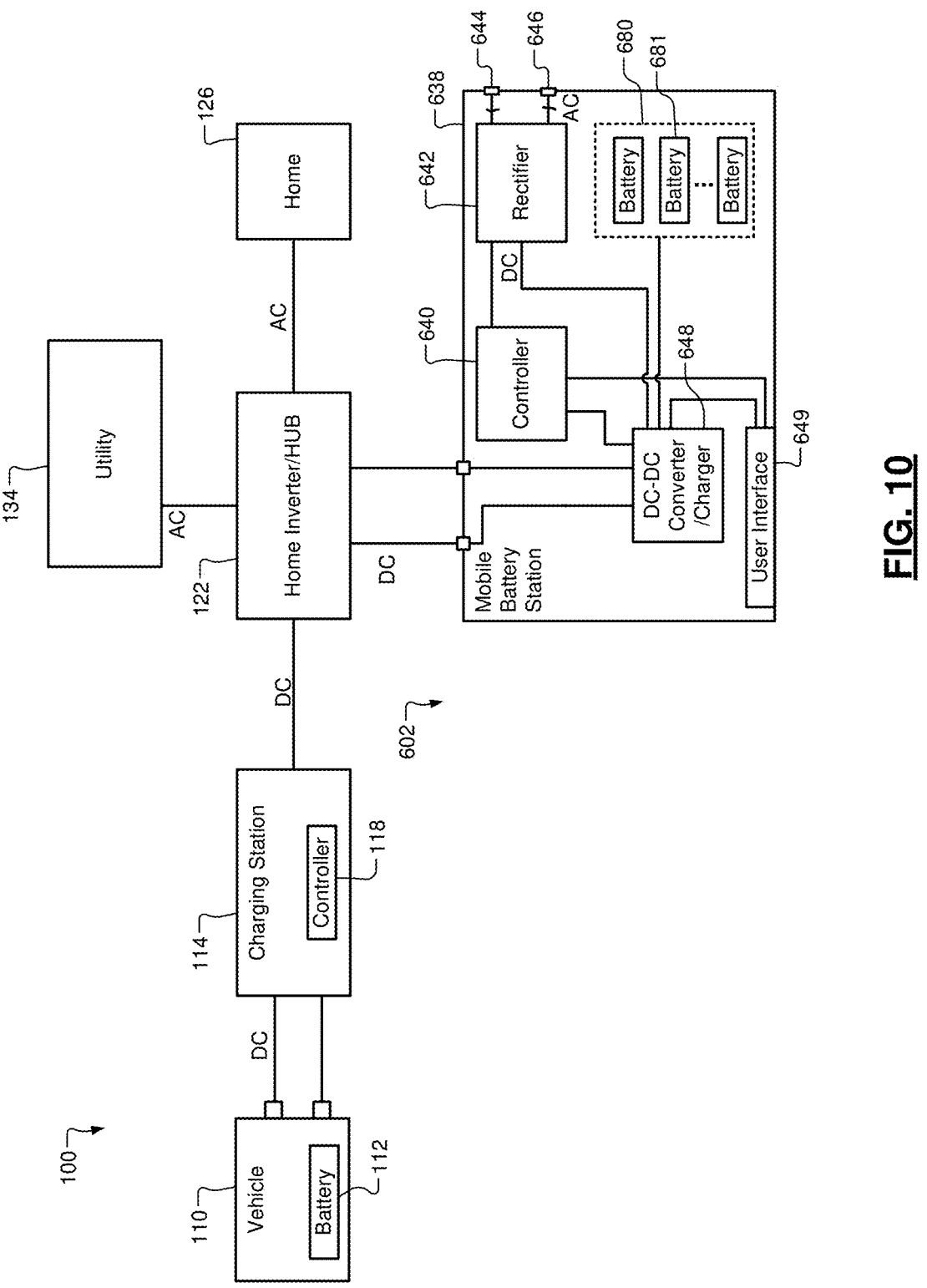
FIG. 10 is a functional block diagram of the vehicle charging system and a simplified mobile battery station configured in a vehicle supply mode according to the present disclosure.

Referring now to FIG. 10, the vehicle charging system 100 and a simplified version of an MBS 602 is shown in a vehicle supply mode. The MBS 102 602 includes a rectifier 642 to convert AC power (such as 120V/240V) to DC power to charge the internal battery pack 680. A DC-DC converter/charger 648 converts the DC power from a rectifier 642 to a DC voltage required by the internal battery pack 680. The DC-DC converter/charger 648 is also configured to convert power from the internal battery pack 680 to a voltage/current level greater than or equal to the minimum voltage/current levels required by the controller 118 of the charging station 114 to allow the controller 118 of the charging station 114 to start supplying power from the vehicle 110 to the home 126.

The mobile battery station according to the present disclosure has multiple use cases, portability, and cross functionality between applications. As a stationary unit attached to the V2H system, the mobile battery station provides voltage to perform standard DIN 70121 and J1772 connection path from the charging station to the electric vehicle.

The mobile battery station can also be configured to provide a burst increase in charging power for residential charging applications beyond what a normal residential supply could provide by adding the power from the batteries to the supply power.

As a mobile device, the mobile battery station can be used as a mobile charge station for electric vehicles that are out of energy on the roadside, providing enough mileage to get an out of energy vehicle to a charging destination.

The mobile battery station can be configured to charge various batteries through a vehicle to load (V2L) interface on the vehicle, (useful for contractors, landscapers, etc.), where grid power may not be readily available or feasible for usage. The mobile battery station can be configured to power 120V and 240V outlets to supply power to plug in tools where an extension cord from the V2L system may not be feasible.

The mobile battery system can be configured with or without an internal battery pack. The usage of smaller consumer batteries (as external batteries) provides a lighter-weight system when disassembled, which may help with transportation of the device by those without the physical strength- or with disabilities.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A.

Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle charging system comprising:
a charging station comprising a controller configured to selectively supply power from a vehicle to a home,
wherein the controller enables charging in response to a predetermined minimum voltage and a predetermined minimum current on an electric vehicle supply equipment (EVSE) side of the charging station;
a mobile battery station configured to supply power from a plurality of batteries to the EVSE side of the charging station at a first voltage greater than or equal to the predetermined minimum voltage and a first current greater than the predetermined minimum current;
a user interface configured to select one of a plurality of operating modes; and
a DC-DC converter/charger configured to supply power from the plurality of batteries to a home inverter/rectifier/hub connected to the EVSE side of the charging station and to receive power from the home inverter/rectifier/hub to charge the plurality of batteries.

2. The vehicle charging system of claim 1, wherein the plurality of batteries includes an internal battery pack including first ones of the plurality of batteries.

3. The vehicle charging system of claim 1, wherein the plurality of batteries comprise P external batteries connected to the mobile battery station, where P is an integer greater than zero.

4. The vehicle charging system of claim 3, wherein the mobile battery station comprises:
P ports, wherein at least one of the P ports includes a first connection format, and
an adapter configured to adapt a second connection format of at least one of the P external batteries to the first connection format of the at least one of the P ports.

5. The vehicle charging system of claim 3, wherein the P external batteries comprise batteries configured to power at least one of power tools and equipment.

6. The vehicle charging system of claim 3, wherein:
the mobile battery station comprises a rectifier, and
based on the selected one of the plurality of operating modes of the mobile battery station, the mobile battery station is configured to rectify at least one 120V AC and 240V AC to a DC voltage.

7. The vehicle charging system of claim 3, wherein:
the mobile battery station comprises an inverter, and
based on the selected one of the plurality of operating modes of the mobile battery station, the mobile battery station is configured to invert a DC voltage from the DC-DC converter/charger to supply at least one 120V AC and 240V AC.

8. The vehicle charging system of claim 1, wherein, based on the selected one of the plurality of operating modes of the mobile battery station, the DC-DC converter/charger is configured to output power from the plurality of batteries to the vehicle.

9. The vehicle charging system of claim 1, wherein, based on the selected one of the plurality of operating modes of the mobile battery station, the DC-DC converter/charger is selectively configured to at least one of:
output power from the plurality of batteries to the vehicle; and
receive power from the vehicle and charge the plurality of batteries.

10. A method for operating a vehicle charging system comprising:
providing a charging station comprising a controller configured to selectively supply power from a vehicle to a home,
wherein the controller enables charging in response to a predetermined minimum voltage and a predetermined minimum current on an electric vehicle supply equipment (EVSE) side of the charging station;
configuring a mobile battery station to supply power from a plurality of batteries to the EVSE side of the charging station at a first voltage greater than or equal to the predetermined minimum voltage and a first current greater than the predetermined minimum current;
selecting one of a plurality of operating modes of the mobile battery station;
supplying power from the plurality of batteries to a home inverter/rectifier/hub connected to the EVSE side of the charging station; and
receiving power from the home inverter/rectifier/hub to charge the plurality of batteries.

11. The method of claim 10, wherein the plurality of batteries includes an internal battery pack including first ones of the plurality of batteries.

12. The method of claim 10, further comprising outputting power from the plurality of batteries to the vehicle based on the selected one of a plurality of operating modes of the mobile battery station.

13. The method of claim 10, further comprising, based on the selected one of the plurality of operating modes of the mobile battery station:
outputting power from the plurality of batteries to the vehicle; and
receiving power from the vehicle and charge the plurality of batteries.

14. A method for operating a vehicle charging system comprising:
providing a charging station comprising a controller configured to selectively supply power from a vehicle to a home,

wherein the controller enables charging in response to a predetermined minimum voltage and a predetermined minimum current on an electric vehicle supply equipment (EVSE) side of the charging station; and configuring a mobile battery station to supply power from a plurality of batteries to the EVSE side of the charging station at a first voltage greater than or equal to the predetermined minimum voltage and a first current greater than the predetermined minimum current, wherein the plurality of batteries comprise P external batteries connected to the mobile battery station, where P is an integer greater than zero.

15. The method of claim 14, wherein the mobile battery station comprises P ports, wherein at least one of the P ports includes a first connection format, and further comprising using an adapter configured to adapt a second connection format of at least one of the P external batteries to the first connection format of the at least one of the P ports.

16. The method of claim 14, wherein the P external batteries comprise batteries configured to power at least one of power tools and equipment.

17. The method of claim 14, wherein the mobile battery station comprises a rectifier, and further comprising configuring the mobile battery station to rectify at least one 120V AC and 240V AC to a DC voltage based on the selected one of a plurality of operating modes of the mobile battery station.

18. The method of claim 14, wherein the mobile battery station comprises an inverter, and further comprising configuring the mobile battery station to invert a DC voltage to supply at least one 120V AC and 240V AC based on the selected one of a plurality of operating modes of the mobile battery station.

* * * * *